United States Patent
Kuno

(10) Patent No.: US 7,753,534 B2
(45) Date of Patent: Jul. 13, 2010

(54) PROJECTION DEVICE AND PROJECTION CONTROL METHOD

(75) Inventor: Toshiya Kuno, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 923 days.

(21) Appl. No.: 11/502,698

(22) Filed: Aug. 11, 2006

(65) Prior Publication Data

US 2007/0046901 A1    Mar. 1, 2007

(30) Foreign Application Priority Data

Aug. 23, 2005    (JP) .............................. 2005-241327

(51) Int. Cl.
*G03B 21/14* (2006.01)

(52) U.S. Cl. .............................. 353/69; 353/37; 353/50; 353/70; 345/44; 345/88; 345/156; 349/5; 349/7; 349/8; 349/9; 386/2; 386/3; 386/4; 386/6; 386/7

(58) Field of Classification Search .................. 353/30, 353/37, 50; 386/2, 3, 4, 6, 7, 13, 40, 44, 386/110, 124, E5.035; 345/44, 88, 156; 349/5, 349/7, 8, 9

See application file for complete search history.

(56) References Cited

U.S. PATENT DOCUMENTS

| 6,118,113 A | 9/2000 | Hibbard et al. | |
| 6,561,651 B1 * | 5/2003 | Kubota et al. | 353/30 |
| 7,133,022 B2 * | 11/2006 | Grabert | 345/156 |
| 2001/0048406 A1 | 12/2001 | Masumoto et al. | |
| 2004/0004675 A1 | 1/2004 | Honda | |
| 2004/0239888 A1 | 12/2004 | Kobayashi | |
| 2005/0030486 A1 | 2/2005 | Lee et al. | |
| 2005/0243286 A1 | 11/2005 | Kobayashi | |

FOREIGN PATENT DOCUMENTS

| CN | 1469191 A | 1/2004 |
| CN | 1536427 A | 10/2004 |
| EP | 1 463 311 A | 9/2004 |

(Continued)

OTHER PUBLICATIONS

Japanese Office Action dated Feb. 24, 2009 (4 pages), and English translation thereof (7 pages), issued in counterpart Japanese Application Serial No. 2005-241327.

(Continued)

*Primary Examiner*—Georgia Y Epps
*Assistant Examiner*—Sultan Chowdhury
(74) *Attorney, Agent, or Firm*—Frishauf, Holtz, Goodman & Chick, P.C.

(57) ABSTRACT

There is disclosed a projection device which includes a light source constituted of a reflector and a light source lamp, a projection system including a projection encoder for forming a light image based on an input image signal to project it by use of light from the light source, a micromirror element and a projection lens, a photographing system including a photographing lens for photographing the projected image, a CCD and a process circuit, and a control section detecting a luminance distribution from the photographed image and correcting a luminance distribution of the light image formed by the micromirror element in accordance with the detected luminance distribution.

11 Claims, 12 Drawing Sheets

FOREIGN PATENT DOCUMENTS

| | | |
|---|---|---|
| JP | 2001-356408 A | 12/2001 |
| JP | 2002-112962 A | 4/2002 |
| JP | 2004-279817 A | 10/2004 |
| JP | 2004-349979 A | 12/2004 |
| JP | 2005-173238 A | 6/2005 |
| JP | 2005-520118 A | 7/2005 |
| WO | WO 03/077013 A2 | 9/2003 |

OTHER PUBLICATIONS

Chinese Office Action dated May 8, 2009 and English translation thereof issued in a counterpart Chinese Application No. 200680030519.8.

* cited by examiner

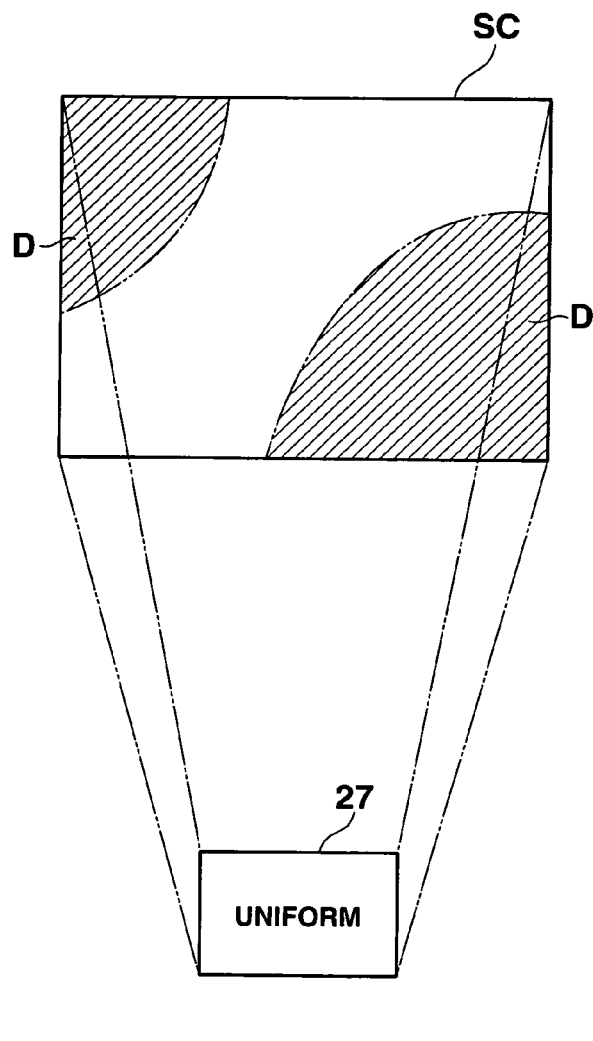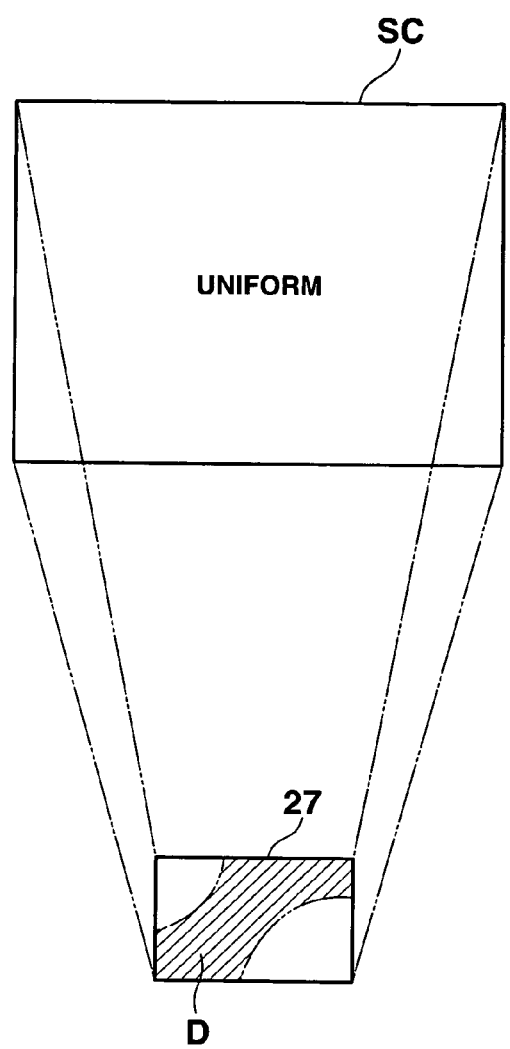
FIG.5A  FIG.5B

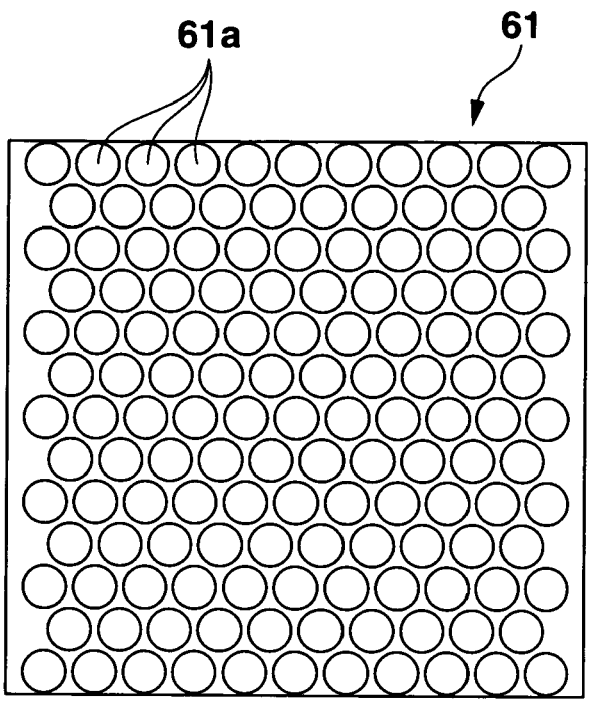
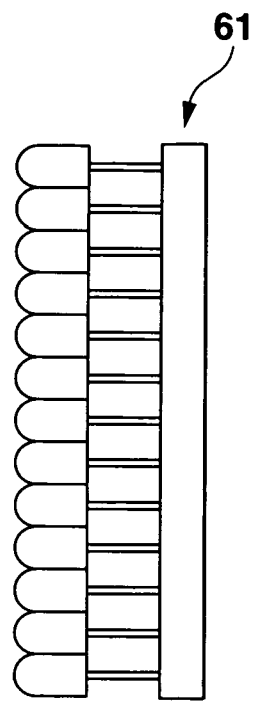
FIG.9A  FIG.9B
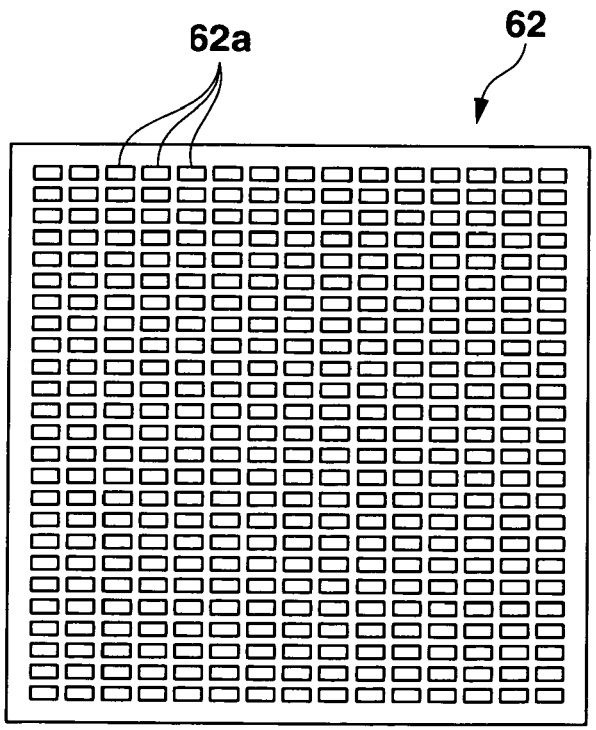
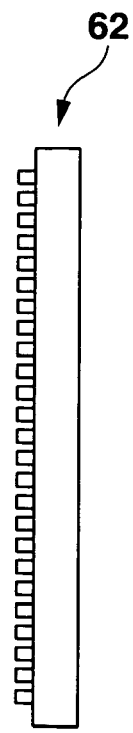
FIG.9C  FIG.9D

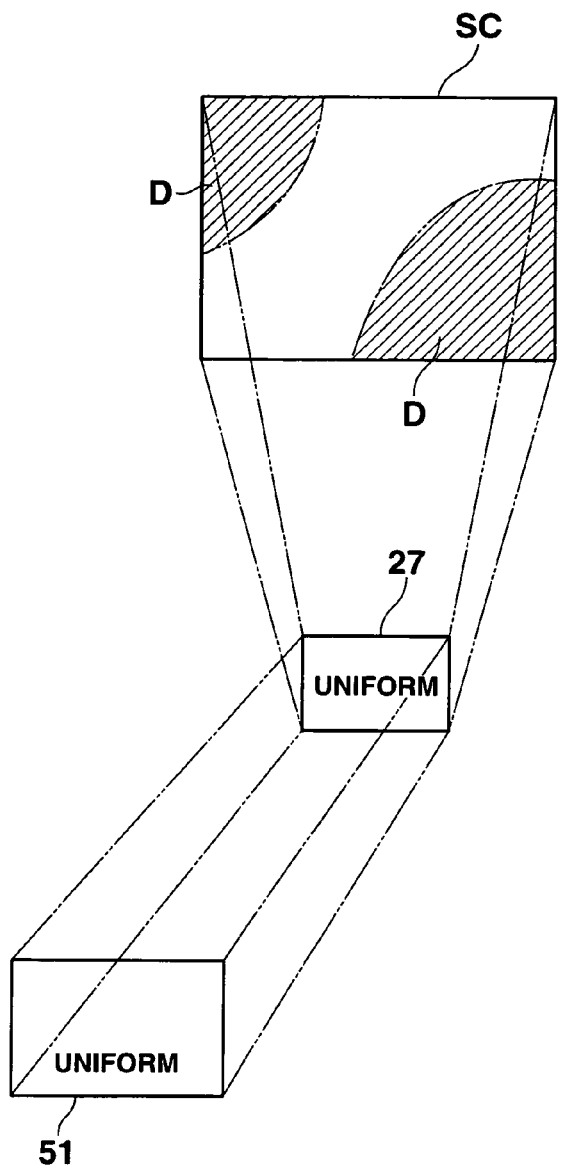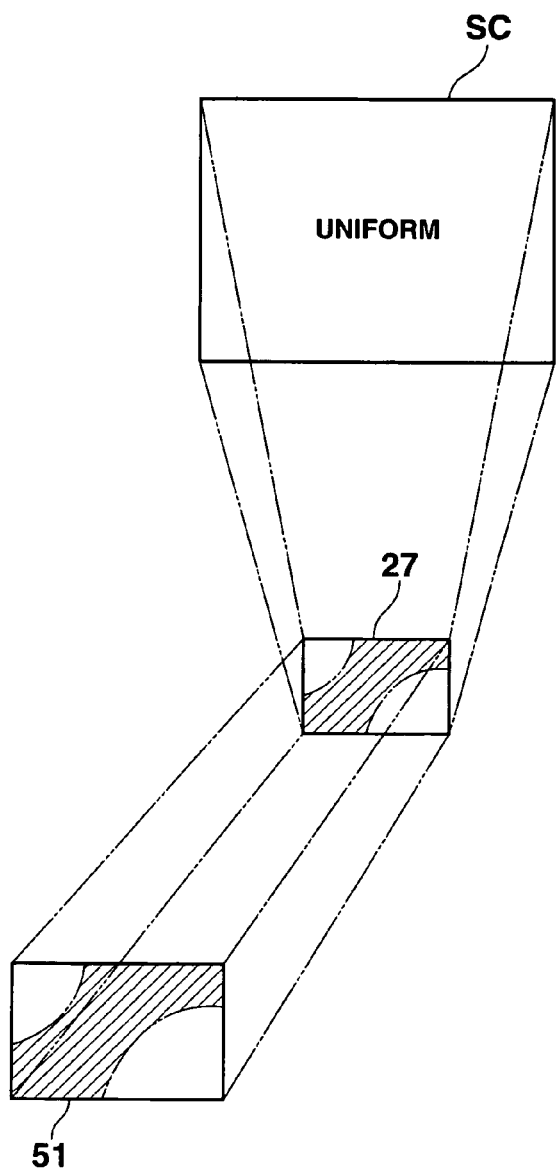
FIG.11A  FIG.11B

PROJECTION DEVICE AND PROJECTION CONTROL METHOD

CROSS-REFERENCE TO RELATED APPLICATIONS

This application is based upon and claims the benefit of priority from prior Japanese Patent Application No. 2005-241327, filed Aug. 23, 2005, the entire contents of which are incorporated herein by reference.

BACKGROUND OF THE INVENTION

1. Field of the Invention

The present invention relates to a projection device and a projection control method which are suitable for, e.g., a projector of a DLP (registered trademark), or the like.

2. Description of the Related Art

Conventionally, as described in Jpn. Pat. Appln. Publication No. 2004-279817, consideration has been given to a technology of a projector which arranges, to improve uniformity of an illuminance distribution, a plurality of light emitting diodes (LED) having similar color lights positioned on lattice points of a roughly regular triangular lattice shape on a substrate to constitute a LED array, modulates an illumination light from the LED array whose illuminance distribution has been made uniform via a transmissive type liquid crystal display (LCD) panel, and projects a color light modulated through the LCD on to a screen by a projection lens optical system, thereby obtaining a projected light of improved uniformity of illuminance distribution.

According to the technology of the above Patent Document, however, even if the illuminance distribution is uniform at a point in time when light is emitted from the LED array as a light source, the illuminance distribution of an image actually projected on the screen is not always uniform.

For example, this situation is conspicuous when a plane of the screen is arranged not vertically but greatly obliquely to a projected optical axis, and a distance from the projection device varies from one projected part to another, such as when trapezoidal correction is made, when the trapezoidal correction is accompanied by a change in image density, or the like. In consequence, while the uniform illuminance distribution is exhibited at the light source, display quality of the actually projected image is greatly degraded.

The present invention has been made with the foregoing situation in mind, and it is an object of the invention to provide a projection device and a projection control method capable of always making uniform an illuminance distribution of an actually projected image irrespective of a projection situation.

BRIEF SUMMARY OF THE INVENTION

A first aspect of the present invention is directed to a projection device comprising:
a light source;
projection means for forming a light image based on an input image signal to project the same by use of light from the light source;
detection means for detecting a luminance distribution of the image projected by the projection means; and
correction means for correcting the luminance distribution of the light image formed by the projection means in accordance with the luminance distribution obtained by the detection means, wherein
the correction means detects states of a direction and a degree of trapezoidal distortion together in a projection target surface based on the luminance distribution obtained by the detection means, and reflects the detected trapezoidal distortion states on a shape of the light image formed by the projection means and correction of the luminance distribution.

A second aspect of the present invention is directed to a projection device comprising:
a surface light source configured by arraying a plurality of light emitting elements;
projection means for forming a light image based on an input image signal to project the same by use of light from the surface light source;
detection means for detecting a luminance distribution of the image projected by the projection means; and
correction means for correcting an emitted light luminance distribution in the surface light source in accordance with the luminance distribution obtained by the detection means, wherein
the correction means detects states of a direction and a degree of trapezoidal distortion together in a projection target surface based on the luminance distribution obtained by the detection means, and reflects the detected trapezoidal distortion states on a shape of the light image formed by the projection means and correction of the luminance distribution.

A third aspect of the present invention is directed to a projection device comprising:
a surface light source configured by arraying a plurality of light emitting elements;
projection means for forming a light image based on an input image signal to project the same by use of light from the surface light source;
detection means for detecting a luminance distribution of the image projected by the projection means; and
correction means for correcting an emitted light luminance distribution in the surface light source in accordance with the luminance distribution obtained by the detection means, wherein
the correction means lowers emitted light luminance of a center than that of a peripheral part of the surface light source.

A fourth aspect of the present invention is directed to a projection control method comprising:
a light source;
a projection step of forming a light image based on an input image signal to project the same by use of light from the light source;
a detection step of detecting a luminance distribution of the image projected by the projection step; and
a correction step of correcting the luminance distribution of the light image formed by the projection step in accordance with the luminance distribution obtained by the detection step, wherein
the correction step detects states of a direction and a degree of trapezoidal distortion together in a projection target surface based on the luminance distribution obtained by the detection step, and reflects the detected trapezoidal distortion states on a shape of the light image formed by the projection step and correction of the luminance distribution.

A fifth aspect of the present invention is directed to a projection control method comprising:
a surface light source configured by arraying a plurality of light emitting elements;
a projection step of forming a light image based on an input image signal to project the same by use of light from the surface light source;

a detection step of detecting a luminance distribution of the image projected by the projection step; and a correction step of correcting an emitted light luminance distribution in the surface light source in accordance with the luminance distribution obtained by the detection step, wherein the correction step detects states of a direction and a degree of trapezoidal distortion together in a projection target surface based on the luminance distribution obtained by the detection step, and reflects the detected trapezoidal distortion states on a shape of the light image formed by the projection step and correction of the luminance distribution.

A sixth aspect of the present invention is directed to a projection control method comprising:

a surface light source configured by arraying a plurality of light emitting elements;

a projection step of forming a light image based on an input image signal to project the same by use of light from the surface light source;

a detection step of detecting a luminance distribution of the image projected by the projection step; and a correction step of correcting an emitted light luminance distribution in the surface light source in accordance with the luminance distribution obtained by the detection step, wherein the correction step lowers emitted light luminance of a center than that of a peripheral part of the surface light source.

BRIEF DESCRIPTION OF THE SEVERAL VIEWS OF THE DRAWING

FIG. 5A is a diagram showing a projected state before the luminance distribution correction according to the first embodiment;

FIG. 5B is a diagram showing a projected state after the luminance distribution correction according to the first embodiment:

FIG. 9A is a front diagram showing a first specific configuration of a light source section according to the second embodiment;

FIG. 9B is a side diagram showing the first specific configuration of the light source section according to the second embodiment;

FIG. 9C is a front diagram showing a second specific configuration of the light source section according to the second embodiment;

FIG. 9D is a side diagram showing the second specific configuration of the light source section according to the second embodiment;

FIG. 11A is a diagram showing a projected state before the luminance distribution correction according to the second embodiment;

FIG. 11B is a diagram showing a projected state after the luminance distribution correction according to the second embodiment;

DETAILED DESCRIPTION OF THE PREFERRED EMBODIMENTS

First Embodiment

A first embodiment in which the present invention is applied to a projector will be described below with reference to the accompanying drawings.

Figure 1:
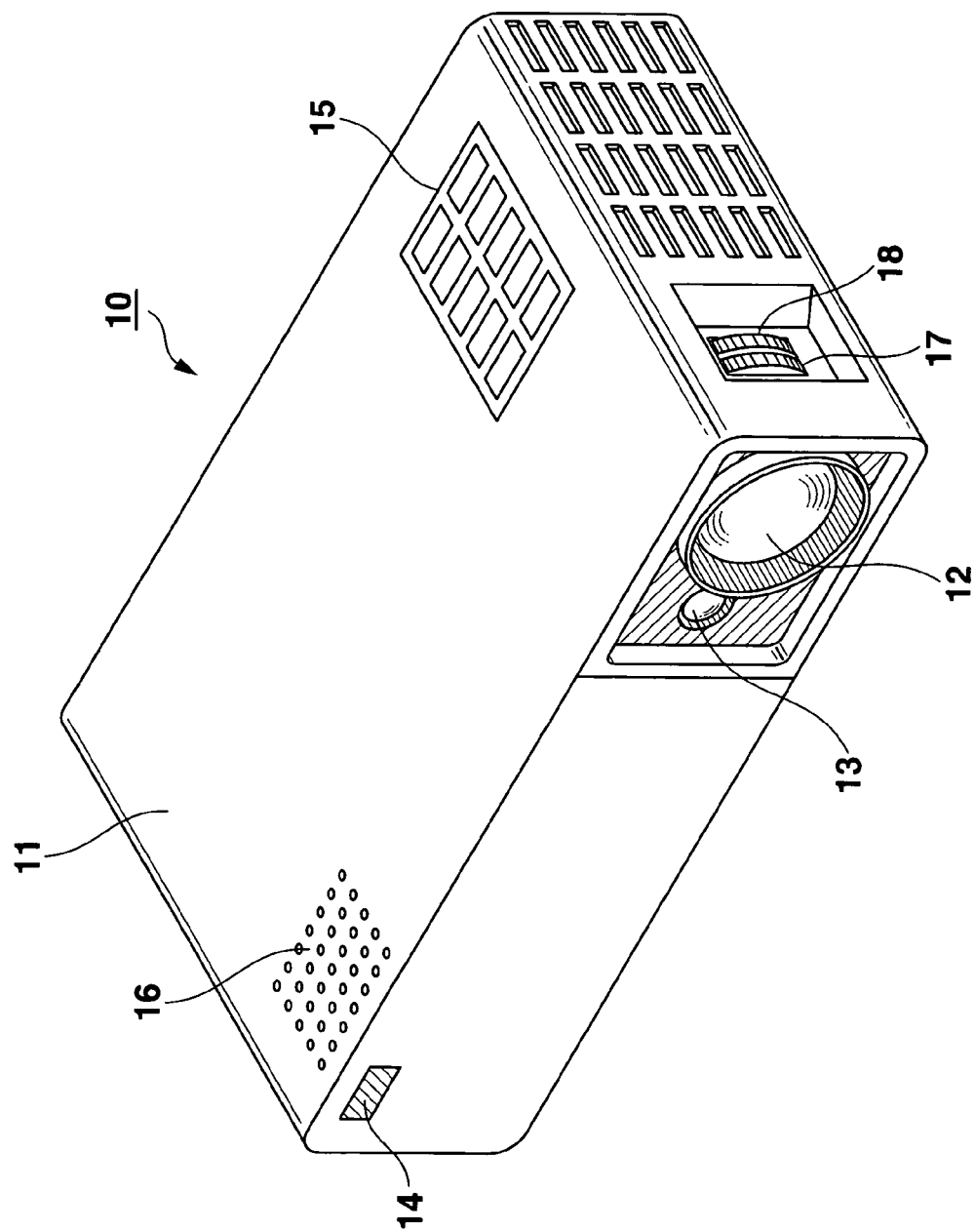
FIG. 1 is a perspective diagram showing an appearance configuration of a projection device according to a first embodiment of the present invention.

FIG. 1 shows an appearance configuration of a projector 10 according to the embodiment, and mainly a front and top surface configuration of a casing is shown. As shown, a projection lens 12 and a photographing lens 13 are buried close to each other on the right of a part of the front of a rectangular parallelepiped main body casing 1. An Ir reception section 14 is arranged on the left end side of the front of the main body casing 1.

The projection lens 12 projects a light image formed by a spatial optical modulator such as a micromirror described below on an object such as a screen, and presumed to be capable of optionally varying a focus position and a zoom position (projection angle of field).

The photographing lens 13 photographs an image projected and displayed by the projection lens 12. The photographing lens 13 is presumed to be capable of varying a focus position and a zoom position, especially the zoom position being controlled in association with the zoom position of the projection lens 12, and to be always controlled to set a photographing range corresponding to a size of the image projected by the projection lens 12.

The Ir reception section 14 receives an infrared light (Ir) signal having a key operation signal superposed thereon from a remote controller of the projector 10 (not shown).

A key switch section 15 and a speaker 16 are arranged in the top surface of the main body casing 11.

The key switch section 15 includes various key switches for instructing turning ON/OFF a device power source, input switching, automatic focusing, automatic trapezoidal correction, mode selection, luminance distribution correction, and the like.

The speaker 16 amplifies and discharges an input voice signal, a beep sound during an operation, or the like.

A zoom ring 17 for manually operating the zoom position of the projection lens 12 and a focus ring 18 for manually operating the focus position are partially exposed on the left side face of the main body casing 11.

An input/output connector section, an Ir reception section similar to the Ir reception section 14, and an AC adaptor connection section are arranged in the backside (not shown) of the main body casing 11.

For example, the input/output connector section includes a USB terminal for connection with an external device such as a personal computer, an RGB mini D-SUB terminal for video input, an S terminal, an RCA terminal, a stereo mini terminal for voice input, and the like.

The AC adaptor connection section connects a cable from an AC adaptor (not shown) which becomes a power source.

Next, a functional configuration of an electronic circuit of the projector 10 will be described with reference to FIG. 2.

In the drawing, image signals of various standards input from the input/output connector section 21 are unified into an image signal of a predetermined format at an image conversion section 23 via an input/output interface 22 and a system bus SB, and then sent to a projection encoder 24.

The projection encoder 24 develops and stores the sent image signal in a video RAM 25, and generates a video signal from the stored contents of the video RAM 25 to output it to a projection driving section 26.

For example, the projection driving section 26 displays and drives the micromirror element 27 which is a spatial optical modulator in faster time-division driving in which a frame rate, e.g., 60 [frame/second], the number of divided color components, and the number of displayed grayscales are multiplied corresponding to the sent image signal as occasion demands.

A high-luminance white light emitted from a light source lamp 29 constituted of a super-high pressure mercury lamp or the like and arranged in a reflector 28 is properly colored by a primary color via a color wheel 30, and applied to the micromirror element 27 via an integrator 31 and a mirror 32, whereby a light image is formed by its reflected light, and projected to be displayed on the screen (not shown) via the projection lens 12.

However, the motors (M) 33 for lighting and driving the light source lamp 29 and rotating and driving the color wheel 30 are all operated based on a supply voltage value from the projected light processing section 34.

It is a control section 35 that is in charge of operation control of all the above circuits. This control section 35 includes a CPU, a real-time clock (RTC) for continuously executing a clocking operation including current time irrespective of a power supply state of the device, a nonvolatile memory for storing an operation program to execute various projection operations including luminance distribution correction described below by the CPU, a work memory, and the like.

A process circuit 36, an image recording section 37, and a voice processing section 38 are connected to the control section 35 via a system bus SB.

The process circuit 36 receives an output of a CCD 39 arranged as an imaging device after a photographed optical axis of the photographing lens 13 to subject a light image formed by the photographing lens 13 to photoelectric conversion, digitizes an image signal of an analog value from the CCD 39, executes a color process including pixel interpolation processing and γ correction processing to generate a luminance signal R and color-difference signals Cb, Cr of digital values, and outputs them to the image conversion section 23 via the system bus SB.

The image conversion section 23 compresses data of the luminance and color-difference signals by processing such as Huffman coding, and writes the obtained image data in the image recording section 37 mounted as a recoding medium of the projector 10. For example, the image recording section 37 includes a flash memory or the like to store image data obtained by photographing.

The voice processing section 38 includes a voice source circuit such as a PCM voice source, converts voice data given during a projection operation into analog data, and drives the speaker 16 to amplify and output the voice, or to generate a beep sound when necessary.

Each key operation signal of the key switch section 15 is directly input to the control section 35, and a signal from the Ir reception section 40 is directly input. This Ir reception section 40 includes the Ir reception section 14 and an Ir reception section disposed in the backside of the main body casing 11, and converts an infrared light receiving signal into a code signal to send it to the control section 35.

Figure 3:
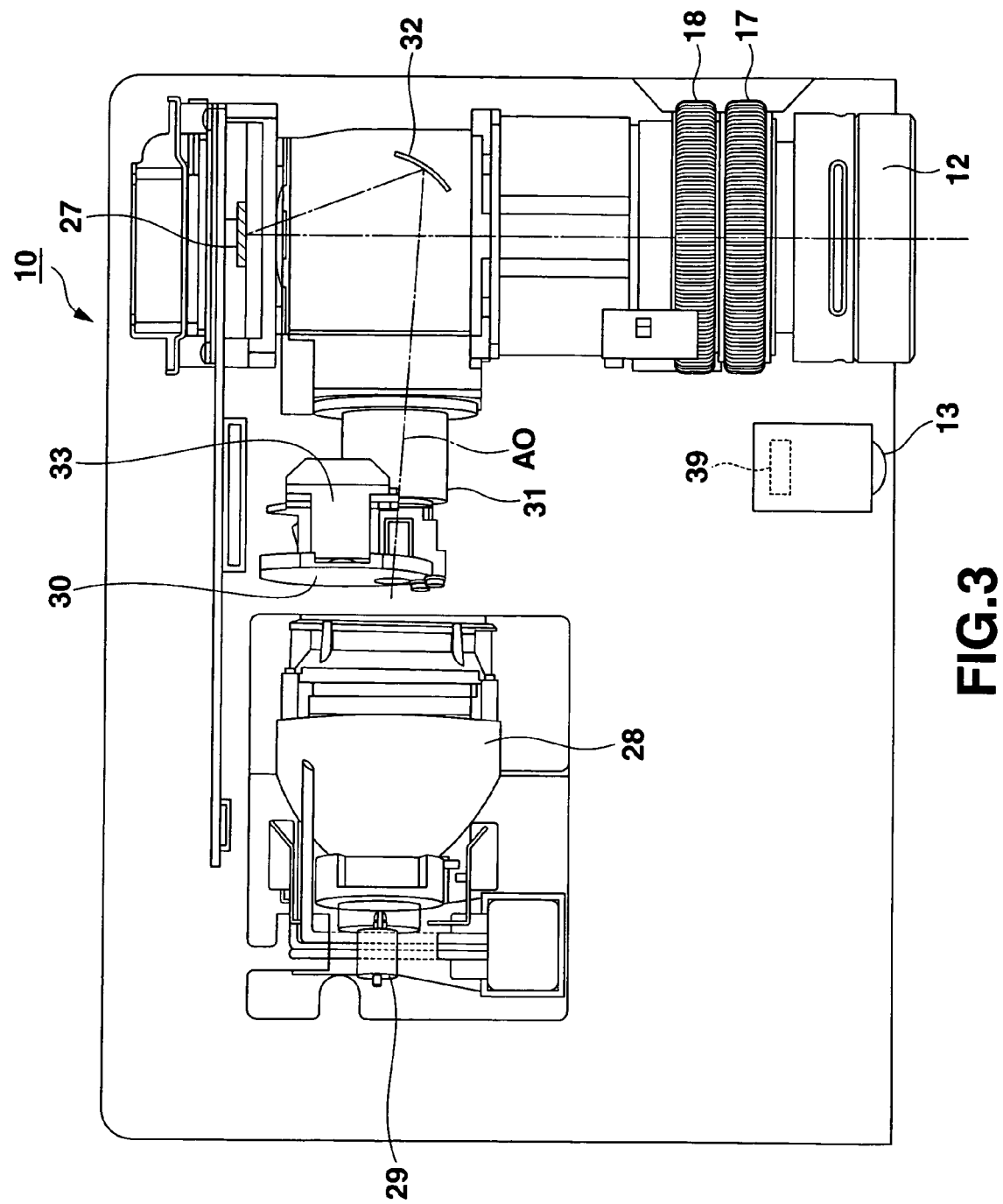
FIG. 3 is a diagram showing a mounting configuration of a projection system according to the first embodiment.

FIG. 3 is a transverse plan diagram showing a structure of the projection system disposed in the main body casing 11 of the projector 10.

The reflector 28 is configured by disposing an ultraviolet transmissive reflection film in the entire inner surface of a heat-resistant glass main body having an opening shape in which a hollow elliptic body is cut vertically to its long axis, and the light source lamp 29 constituted of a short arc lamp such as a super-high pressure mercury lamp is arranged therein.

A major part of light emitted from the light source lamp 29 is reflected on the inner surface of the reflector 28, and applied together with a direct light from the light source lamp 29 to the color wheel 30 along an optical axis AO (shown).

This color wheel 30 is constituted of a rotary plate disposed by arraying three fan-shaped red, green and blue color filters in a peripheral direction, and arranged by fixing its center to a rotary shaft of the motor 33 and setting a part of the wheel peripheral direction in an optical axis of emitted lights from the reflector 28 and the light source lamp 29.

The motor 33 drives the color wheel 30 to rotate at a high speed, whereby the three color filters sequentially cross the optical axis of the emitted lights from the reflector 28 and the light source lamp 29 to give colors and to output them to the integrator 31.

The integrator 31 is constituted of a square cylindrical shape having a sectional shape similar to an outer shape of a display area in which a plurality of pixels of the micromirror element 27 are arrayed in a matrix shape, and a reflection film formed in its entire inner peripheral surface. Light emitted from the integrator 31 and made uniform in luminance distribution is fully reflected by the mirror 32, and then applied to the micromirror element 27.

The micromirror element 27 (its configuration is not shown) includes micromirrors arranged in an array form in which each pixel is tiled in one and the other directions by a mirror driving element using a CMOS as a base, and these micromirrors are made of very thin metal pieces (e.g., aluminum pieces) of 10 to 20 μm in longitudinal and horizontal width.

The micromirror element 27 reflects light applied at an incident angle of a predetermined angle range from an incident direction tilted in one direction with respect to its front direction by switching a tilting direction of the plurality of micromirrors to display an image. Light applied to the micromirror tilted in one direction is reflected in a front direction by this micromirror, light applied to the micromirror tilted in the other direction is reflected in an oblique direction by this micromirror, and an image is displayed bright by the reflection in the front direction and dark by the reflection in the oblique direction.

The brightness of the displaying can be optionally changed by controlling a time width in which the micromirror is tilted in one direction (tilting direction to reflect the incident light in the front direction). Accordingly, an image having grayscales in brightness can be displayed by the micromirror element 27.

A light image formed by the micromirror element 27 is emitted to the screen or the like which becomes a projection target via a plurality of lens optical systems constituting the projection lens 12. The projection lens 12 is electrically driven by a motor (not shown) to vary a zoom position and a focus position. It is manually operated by the user as described above, and the zoom ring 17 and the focus ring 18 on the left side face of the main body casing 11 are manually operated to enable movement of a zoom lens and a focus lens (not shown) in the lens optical system in a lens axial direction.

The photographing lens 13 is disposed adjacently to the projection lens 12 in the front of the main body casing 11. The CCD 39 is arranged after the photographing optical axis of the photographing lens 13, i.e., an image forming position, and the light image projected by the projection lens 12 is photographed by use of the photographing lens 13.

Next, an operation of the embodiment will be described.

Figure 4:
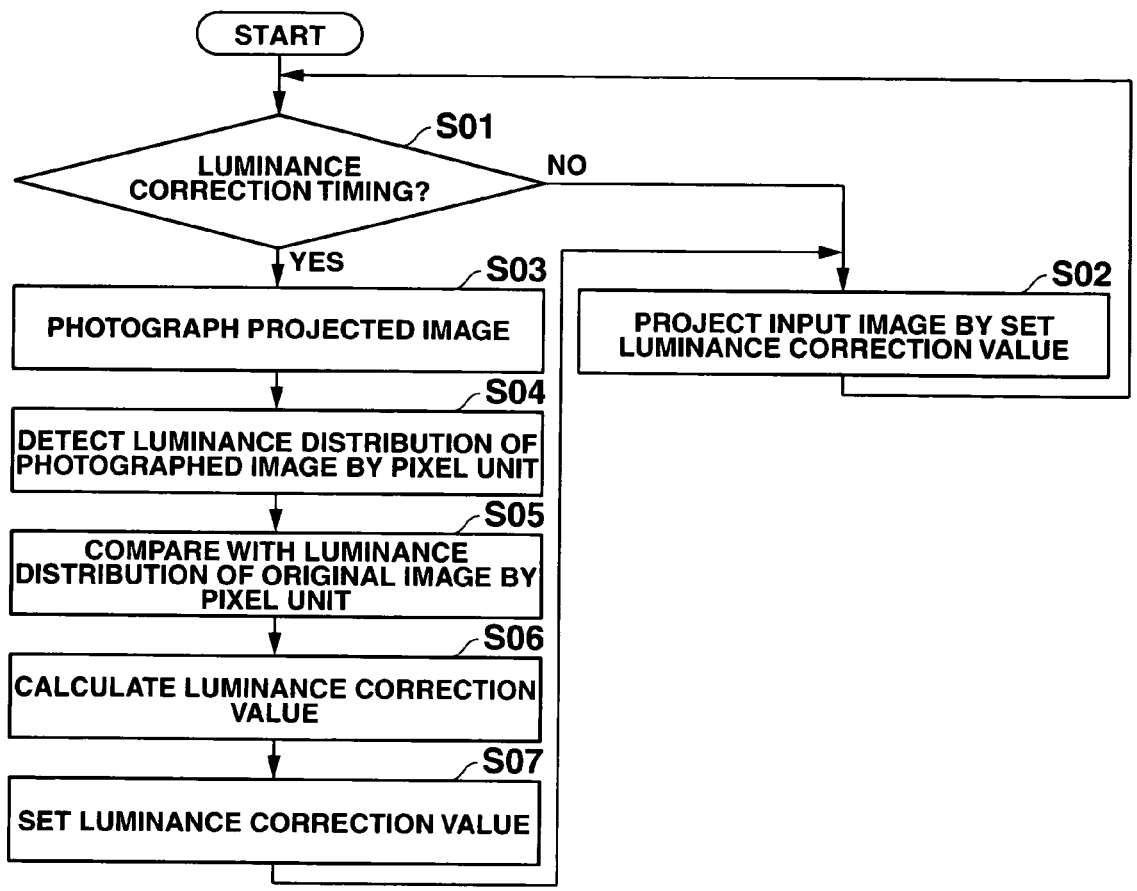
FIG. 4 is a flowchart showing control processing contents of luminance distribution correction according to the first embodiment.

FIG. 4 shows processing contents of luminance distribution correction executed when a luminance correction cycle to be set, e.g., 10 minutes, passes and when a luminance distribution correction key of the key switch section 15 is operated in the process of an operation of projecting individual images constituting document files in presentation or the like by an external device connected to the projector 10, e.g., a personal computer. The control section 35 executes all the processing operations by the internal CPU based on operation programs stored in the nonvolatile memory thereof.

Initially in the process, determination is made as to whether a timing for executing luminance distribution correction has been reached based on reaching of a luminance correction cycle clocked by the RTC of the control section 35 or an operation of the luminance distribution correction key of the key switch section 15 (step S01).

If it is determined that the timing has not been reached, the projection driving section 26 is controlled to execute a projection operation so that luminance of an image displayed by the micromirror element 27 can be corrected based on a luminance correction value having been set before a point of this time (step S02), and then the process returns to the step S01. This process is repeated to wait for reaching of the timing.

On the other hand, if the timing for executing the luminance distribution correction has been reached, this is determined in the step S01, an image projected before a point of this time is photographed by the photographing lens 13 and the CCD 39, a color process is properly executed by the process circuit 36, and luminance information is detected by a pixel unit constituting the photographed image (steps S03, S04).

Then, the control section 35 compares a luminance distribution of an original image displayed by the micromirror element 27 at a point of this time with the luminance information of the photographed image by a pixel unit (step S05), thereby calculating a luminance correction value of the entire image to be projected (step S06).

The luminance correction value of the entire image thus obtained is newly set (step S07). Then, the process proceeds to the step S02 to control the projection driving section 26 to execute a projection operation so that the luminance of the image displayed by the micromirror element 27 can be corrected based on the set luminance correction value.

FIG. 5A shows an example of a state before the luminance distribution correction is executed. To simplify explanation, an image to be projected is white only in the front. In actuality, however, its luminance distribution correction is executed in a projected state of an image based on image data input by the input/output connector 21.

FIG. 5A shows a state in which while luminance grayscales of the image displayed by the micromirror element 27 are equal to those of the original image data by pixel units thereby realizing an entirely uniform luminance distribution, in other words, a luminance distribution faithful to the original image, a left upper side and a right lower side become dark parts D on the screen projection surface SC depending on a projection environment causing uneven luminance.

Thus, by executing a luminance distribution correction process similar to that described above with reference to FIG. 4, a luminance correction value in which a minus degree is larger for an image brighter at each pixel unit by use of a darkest pixel part of the dark part D as a reference is calculated, and luminance of each pixel of the image displayed by the micromirror element 27 is corrected.

After this correction, as shown in FIG. 5B, display grayscales are corrected in a state in which uneven luminance occurs by a pattern reverse to the luminance distribution in the screen projection surface SC of FIG. 5A by the micromirror element 27, specifically, in a state in which a luminance value of the center part originally brightly projected and displayed is lowered in accordance with its degree as indicated by the dark part D in the drawing, except for the left upper side and the right lower side thereof.

As a result, the uneven luminance generated in FIG. 5A is canceled in the screen projection surface SC, the luminance distribution is made uniform as a whole as shown in FIG. 5B, whereby the image can be projected and displayed with high quality.

Accordingly, in the device using a point light source such as a super-high-pressure mercury lamp whose own emitted light luminance distribution is not uniform, factors including an environment of the projection target side or the like such as an installing state are controlled overall, and a luminance distribution of an actually projected image can be made uniform by executing luminance distribution correction corresponding to a lastly projected state when a light image is formed by the micromirror element 27 or the like.

Additionally, as a method for detecting a luminance distribution of a projected image, for example, a method of temporarily projecting and displaying an image white on a full surface to detect luminance of a plurality of point positions in the image, or the like is conceivable. According to the embodiment, however, the projected image is photographed, and the photographed image is compared with the original projected image by the pixel unit. Thus, the luminance distribution of the projected image is detected very accurately and minutely, whereby the luminance distribution of the image projected after the correction can be made uniform more precisely.

According to the embodiment, as a variance in reflectance by the pixel unit of the micromirror element 27 can correspondingly be corrected, manufacturing costs can be reduced by improving yield of the micromirror element 27.

Modified Example of First Embodiment

Next, as a modified example of the embodiment, a case of executing luminance distribution correction according to execution time of automatic trapezoidal correction will be described.

Figure 2:
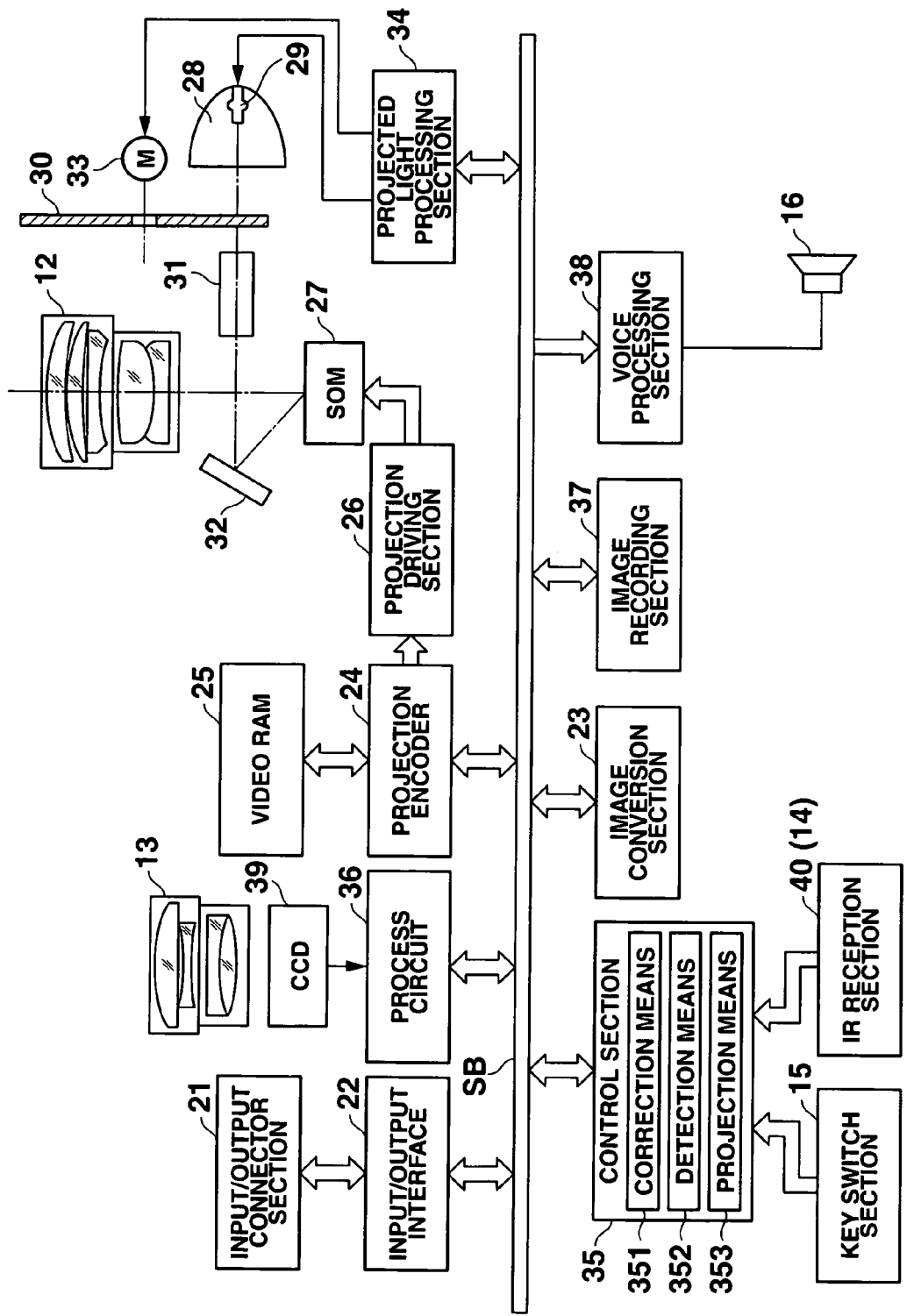
FIG. 2 is a block diagram showing a conceptual configuration of an electronic circuit according to the first embodiment.

An appearance configuration of a projector 10, a functional configuration of an electronic circuit, and a structure of a projection system are basically similar to those of FIG. 1, FIG. 2, and FIG. 3 respectively. Similar sections are denoted by similar reference numerals, and illustration and description thereof will be omitted.

Next, an operation of the modified example will be described.

First, consideration will be given to a case in which automatic trapezoidal correction and luminance distribution correction are not carried out.

Each of FIGS. 6A to 6D shows a luminance distribution in a screen projection surface SC when a micromirror element 27 displays an image by a uniform luminance distribution to project and display the image. "A" to "D" in the screen projection surface SC indicate luminance of the positions in order of brightness by easy representation.

Figure 6A:
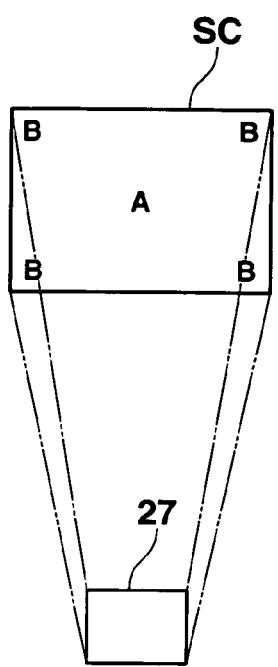
FIG. 6A is a diagram showing a relation between trapezoidal distortion and a luminance distribution according to a modified example of the first embodiment.

FIG. 6A shows a state in which a projected optical axis of a projection lens 12 is positioned vertically in each of up-and-down and left-and-right directions with respect to a center of the screen projection surface SC. As compared with the luminance "A" of the center position, a projected optical path is longer by an amount equal to distances of four corners of the screen projection surface SC from the center, and luminance of each corner is "B" which is slightly lower than "A".

Figure 6B:
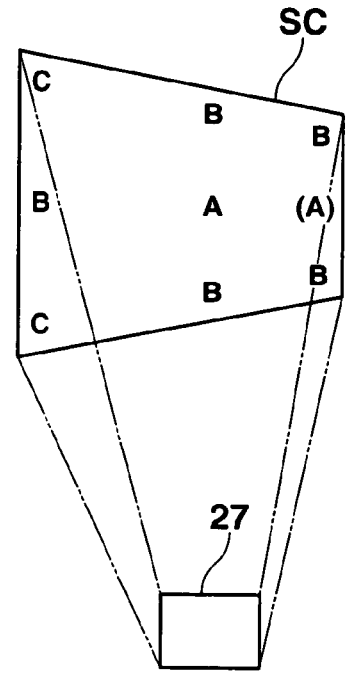
FIG. 6B is a diagram showing a relation between trapezoidal distortion and a luminance distribution according to a modified example of the first embodiment.

FIG. 6B shows a case in which a projected optical axis of the projection lens 12 is positioned vertically in an up-and-down direction but not in a left-and-right direction with respect to the screen projection surface SC, for example, a case in which an image is projected from a right direction toward the screen at a height equal to the center of the vertically set screen projection surface SC.

As compared with a case in which luminance of the center position of the projected image is "A" and luminance of each of its upper and lower ends is slightly lower "B", on a right side in which a distance from the photographing lens 13 is smaller (nearer) than that of the projection center, luminance of its center position is a value ("(A)" in the drawing) higher than "A", and luminance of each of its upper and lower ends is "B" which is slightly lower.

On the other hand, on a left side in which a distance from the photographing lens 13 is larger than that of the projection center of the screen projection surface SC, a luminance of its center position is "B" lower than "A", and luminance of each of its upper and lower ends is much lower "C".

Figure 6C:
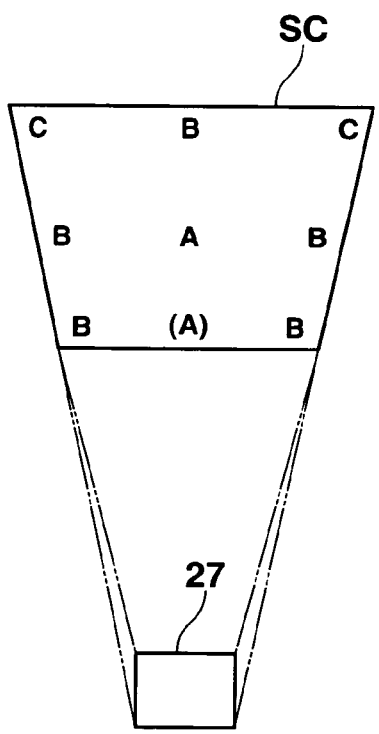
FIG. 6C is a diagram showing a relation between trapezoidal distortion and a luminance distribution according to a modified example of the first embodiment.

FIG. 6C shows a state in which a projected optical axis of the projection lens 12 is positioned vertically in a left-and-right direction but not vertically in an up-and-down direction with respect to the screen projection surface SC, for example, a state in which an image is projected from a slightly lower screen side in the center front of the vertically set screen projection surface SC.

As compared with a case in which luminance of the center position of the projected image is "A" and luminance of each of its left and right ends is slightly lower "B", on a lower side in which a distance from the photographing lens 13 is smaller (nearer) than that of the projection center, luminance of its center position is a value ("(A)" in the drawing) higher than "A", and luminance of each of its left and right ends is "B" which is slightly lower.

On the other hand, on an upper side in which a distance from the photographing lens 13 is larger (farther away) than that of the projection center of the screen projection surface SC, luminance of its center position is "B" slightly lower than "A", and luminance of each of its left and right ends is "C" which is much lower.

Figure 6D:
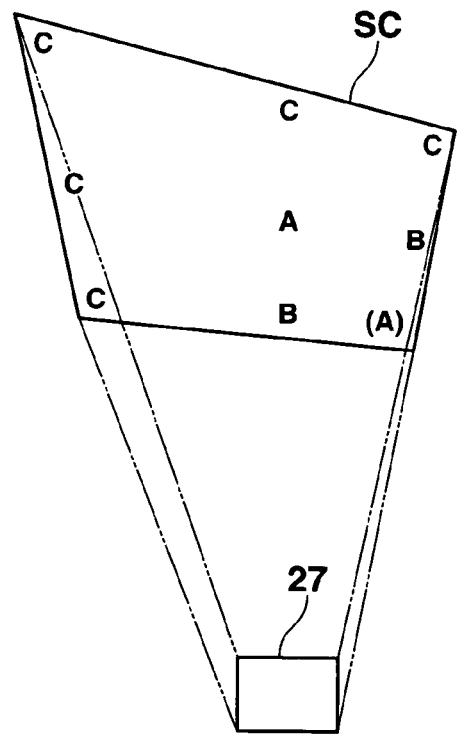
FIG. 6D is a diagram showing a relation between trapezoidal distortion and a luminance distribution according to a modified example of the first embodiment.

FIG. 6D shows a case in which a projected optical axis of the projection lens 12 is not positioned vertically in up-and-down and left-and-right directions with respect to the screen projection surface SC, for example, a state in which an image is projected from a right lower side toward the center of the vertically set screen projection surface SC.

As compared with a case in which luminance of the center position of the projected image is "A", luminance of its lower end is slightly lower "B", and luminance of its upper end is much lower "C", luminance is a value ("(A)" inn the drawing) higher than "A" in a right lower end in which a distance from the photographing lens 13 is smaller (nearer) than that of the projection center, luminance of a right center is "B", and luminance of a right upper end is "C".

On the other hand, on a left side in which a distance from the photographing lens 13 is larger (farther) than that of the projection center of the screen projection surface SC as a whole, luminance of each of its center position and a lower end is "C", and luminance of an upper end of the left side of a largest distance is "D".

The projection lens 12 and the photographing lens 13 are positioned adjacently to each other as described above with reference to FIGS. 1 and 3. Thus, even when the image projected toward the screen projection surface SC from the projection lens 12 to be displayed is photographed via the photographing lens 13, it is impossible to determine in which direction and how much trapezoidal distortion occurs based on a shape itself of a projected image in the photographed image.

However, as described above with reference to FIGS. 6A to 6D, the luminance distribution can surely be detected in a reflected state of contents thereof based on the direction and the degree of the trapezoidal distortion. Accordingly, it is possible to accurately execute trapezoidal correction from a detected result.

The example of photographing the image by the CCD to detect the luminance has been described. However, the invention is not limited to this example. A degree of luminance may be predicted at each position of the projected surface from a shape of executing trapezoidal correction, and the image to be projected may be projected after luminance correction. With this configuration, luminance correction can be easily carried out, and a correction amount can be reduced even when the image is photographed again by the CCD after image projection to execute luminance correction.

Figure 7:
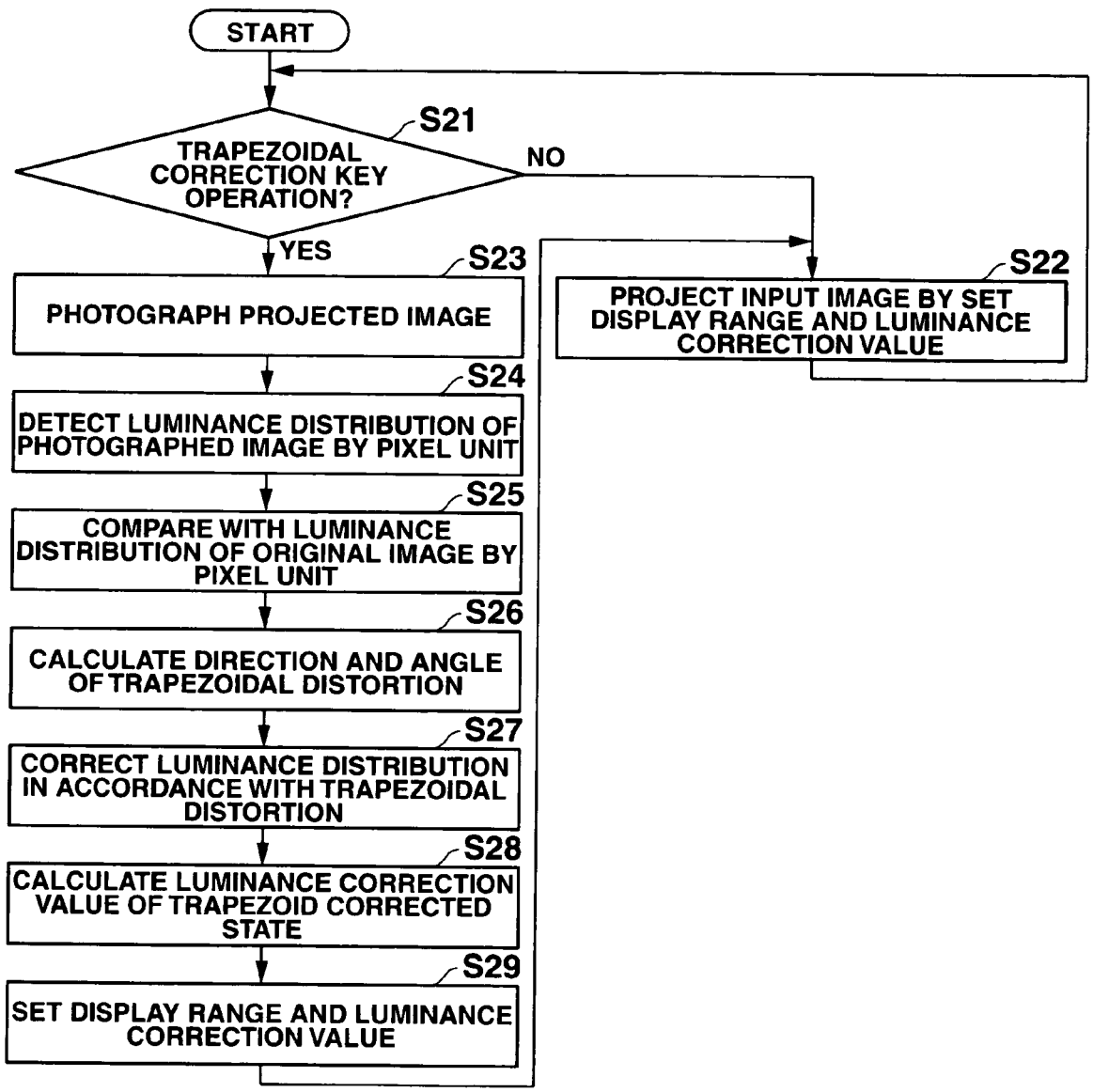
FIG. 7 is a flowchart showing control processing contents of automatic trapezoidal correction and luminance distribution correction according to the first embodiment.

FIG. 7 shows processing contents of automatic trapezoidal correction and luminance distribution correction executed in accordance with an operation of the automatic trapezoidal correction key of the key switch section 15 in the process of an operation of projecting individual images constituting document files in presentation or the like by an external device connected to the projector 10, e.g., a personal computer. The control section 35 executes all the processing operations by the internal CPU based on operation programs stored in the nonvolatile memory thereof.

Initially in the process, determination is made as to whether the automatic trapezoidal correction key of the key switch section 15 has been operated (step S21). If the key has not been operated, the projection driving section 26 is controlled to execute a projection operation so that an image displayed by the micromirror element 27 can be corrected based on a display range and a luminance correction value of the automatic trapezoidal correction having been set before a point of this time (step S22), and then the process returns to step S21. This process is repeated to wait for an operation of the automatic trapezoidal correction key.

On the other hand, if the automatic trapezoidal correction key has been operated, this is determined in step S21, an image projected before a point of this time is photographed by the photographing lens 13 and the CCD 39, a color process is properly executed by the process circuit 36, and luminance information is detected by a pixel unit constituting the photographed image (steps S23, S24).

Then, the control section 35 compares the detected luminance information of the pixel unit with a luminance distribution of an original image displayed by the micromirror element 27 at a point of this time by a pixel unit, thereby obtaining an error of the luminance distribution of the entire image in the screen projection surface SC (step S25).

Based on the error pattern of the luminance distribution thus obtained, as shown in FIGS. 6A to 6D, determination is made as to occurrence of trapezoidal distortion, and its direction and its degree are calculated if the occurrence is determined (step S26).

Subsequently, the luminance distribution error of the entire image obtained in step S25 is corrected in accordance with the direction and the degree of the trapezoidal distortion (step S27). By executing trapezoidal correction, a luminance correction value is calculated in a properly compressed state of a light image formed by the micromirror element 27 (step S28).

The luminance correction value calculated based on the trapezoidal correction is newly set (step S29). Then, the process proceeds to step S22 to control the projection driving section 26 to execute a projection operation so that the range and the luminance of the image displayed by the micromirror element 27 can be corrected based on the set luminance correction value of the trapezoidal correction range.

As a result, the automatic trapezoidal correction process can be executed simultaneously with the luminance distribution correction, and usability of the projector is very high, greatly contributing to improvement of quality of the projected image.

Second Embodiment

A second embodiment in which the present invention is applied to a projector will be described below with reference to the drawings.

An appearance configuration of a projector 10' of the embodiment is basically similar to that shown in FIG. 1 except for the small size (width) of the horizontal direction. Accordingly, similar sections are denoted by similar reference numerals, and drawings and description thereof will be omitted.

Figure 8:
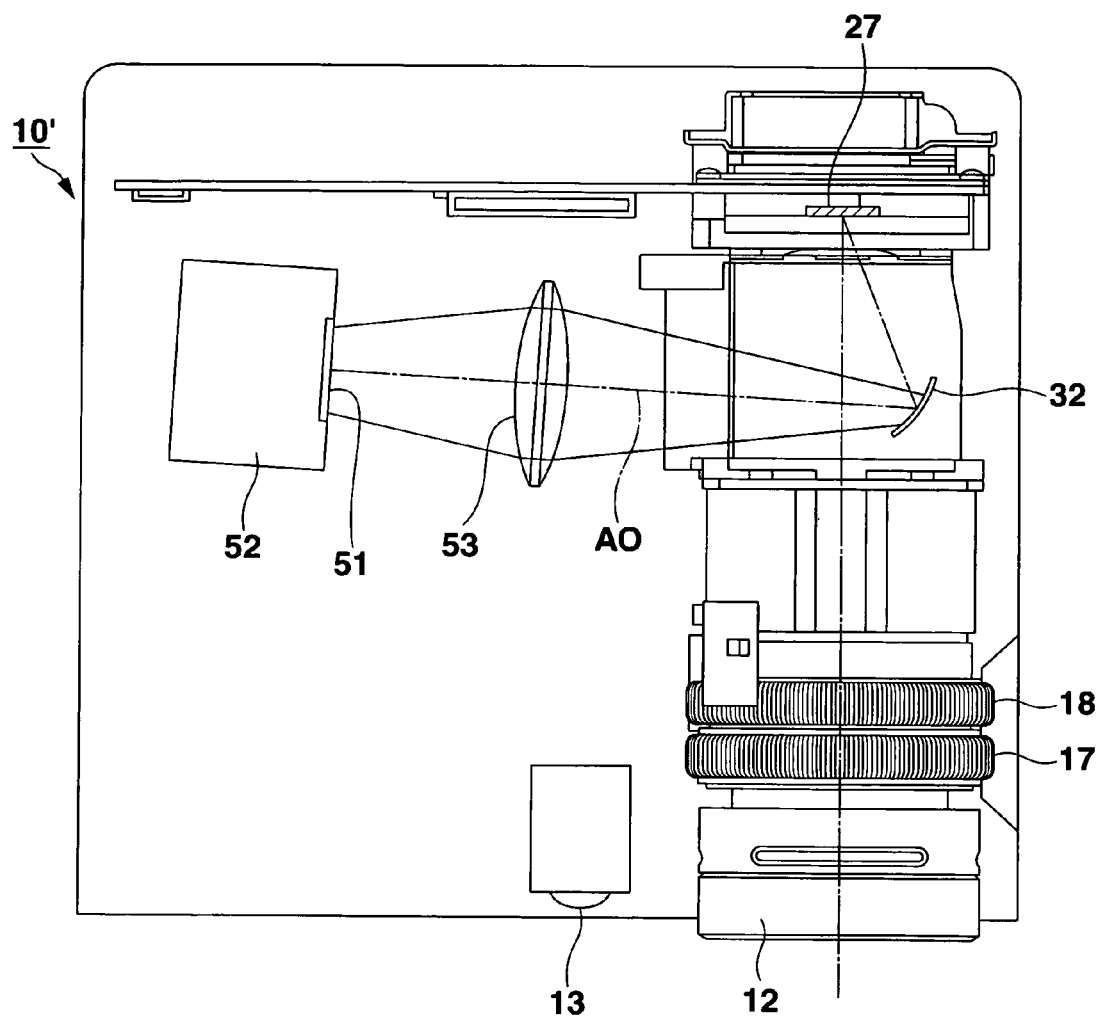
FIG. 8 is a diagram showing a mounting configuration of a projection system according to a second embodiment of the present invention.

FIG. 8 shows a mounting structure of a projection system especially in a main body casing 11 of the projector 10'. In FIG. 8, components of a micromirror element 27 for forming a light image and after are similar to those of FIG. 3. Thus, similar sections are denoted by similar reference numerals, and description thereof will be omitted.

In the drawing, 51 is a surface light source described below in detail, and 52 is a cooler of the surface light source. A light source light colored into primary color components in time division from the surface light source 51 is converged on a converging mirror 53 without passing through a process of making a luminance distribution uniform to be guided to a mirror 32, and applied to the micromirror element 27 after being fully reflected on the mirror 32 to form a light image to be projected.

For example, as shown in FIGS. 9A, 9B, the surface light source 51 includes a LED array 61 in which a plurality of light emitting diodes (LED) 61a, 61a, . . . having tip parts formed into dome shapes to emit lights are arrayed.

In the LED array 61, for example, the LEDs 61a, 61a, . . . , each set consisting of three colors of R (red), G (green) and B (blue), are combined in triangular shapes to be regularly arranged. When a color image is projected and displayed in the projector 10', the LED's 61a, 61a, . . . constituting the LED array 61 are driven to be lit in time division for each primary color component, and an image corresponding to each primary color is driven to be displayed by the micromirror element 27 in synchronization therewith to form its light image.

When a monochromatic image is projected and displayed in the projector 10', the LEDs 61a, 61a, . . . constituting the LED array 61 are all driven to be lit simultaneously, whereby a white color based on a color mixture is applied to the micromirror element 27.

In FIGS. 9A, 9B, the plurality of LEDs 61a, 61a, . . . having tip parts formed into dome shapes are used for the surface light source 51. Instead, however, as shown in FIGS. 9C, 9D, a LED array 62 in which LEDs 62a, 62a, . . . of rectangular chip shapes are arrayed may be used for the surface light source 51.

In this case, a light emitting amount of the surface light source 51 can be increased by reducing gaps among the LEDs 62a, 62a, . . . , and efficiently arranging more LEDs 62a, 62a, . . . in the entire LED array 61.

Except for the above configuration of the light source section, a functional configuration of an electronic circuit is basically similar to that of FIG. 2. Thus, similar sections are denoted by similar reference numerals, and description thereof will be omitted.

Figure 10:
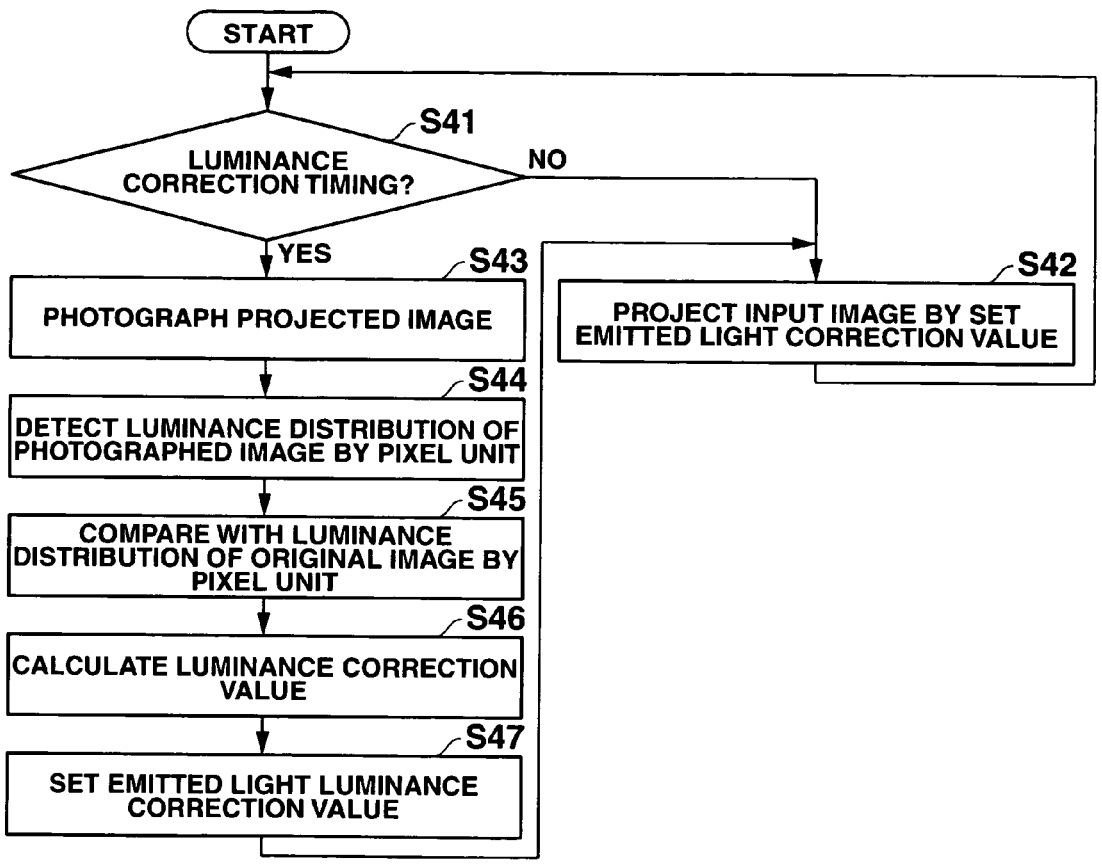
FIG. 10 is a flowchart showing control processing contents of luminance distribution correction according to the second embodiment.

FIG. 10 shows processing contents of luminance distribution correction executed when a luminance correction cycle to be optionally set, e.g., 10 minutes, passes and when a luminance distribution correction key of a key switch section 15 is operated in the process of an operation of projecting individual images constituting document files in presentation or the like by an external device connected to the projector 10, e.g., a personal computer. A control section 35 executes all the processing operations by an internal CPU based on operation programs stored in a nonvolatile memory thereof.

Initially in the process, determination is made as to whether a timing for executing luminance distribution correction has been reached based on reaching of a luminance correction cycle clocked by an RTC of the control section 35 or an operation of the luminance distribution correction key of the key switch section 15 (step S41).

If it is determined that the timing has not been reached, a display operation corresponding to an input image is executed by a micromirror lens 27 to execute a projection operation while an emitted light luminance distribution of the surface light source 51 is corrected based on a luminance correction value having been set before a point of this time (step S42), and then the process returns to step S41. This process is repeated to wait for reaching of the timing.

On the other hand, if the timing for executing the luminance distribution correction has been reached, this is determined in step S41, an image projected before a point of this time is photographed by a photographing lens 13 and a CCD 39, a color process is properly executed by a process circuit 36, and luminance information is detected by a pixel unit constituting the photographed image (steps S43, S44).

Then, the control section 35 compares a luminance distribution of an original image displayed by the micromirror element 27 at a point of this time with the luminance information of the photographed image by a pixel unit (step S45), thereby calculating a luminance correction value of the entire image to be projected (step S46).

The luminance correction value of the entire image thus obtained is newly set to be reflected in an issuance device and a distribution of the surface light source 51 (step S47). Then, the process proceeds to step S22 to execute a display operation corresponding to an input image by the micromirror element 27 thereby executing a projection operation while correcting the emitted light luminance distribution of the surface light source based on the set emitted light luminance correction value, specifically controlling driving current values of individual LEDs (61a, 61a, . . . [62a, 62a, . . . ]) constituting the surface light source 51.

FIG. 11A shows an example of a state before the luminance distribution correction is executed. To simplify explanation, an image to be projected is white only in the front. In actuality, however, its luminance distribution correction is executed in a projected state of an image based on image data input by an input/output connector 21.

FIG. 5A shows a state in which while an emitted light luminance distribution of the surface light source 51 is uniform on a full surface, accordingly, luminance grayscales of the image displayed by the micromirror element 27 are equal to those of the original image data by pixel units thereby realizing a luminance distribution faithful to the original image, a left upper side and a right lower side become dark parts D on a screen projection surface SC depending on a projection environment causing uneven luminance.

Thus, by executing a luminance distribution correction process similar to that described above with reference to FIG. 10, a luminance correction value to increase the luminance of the parts which are the dark parts D by use of a part which is not a dark part D as a reference is calculated, and a surface emitted light of the surface light source 51 is partially corrected.

FIG. 11B shows a projected state after the correction. In the surface light source 51, as indicated by hatching, a part emitting light by the luminance thus far is driven by increasing a driving current value to light the left upper side and the right lower side as the dark parts D at higher luminance to emit lights.

Accordingly, when the micromirror element 27 forms a light image by this light source light, a light image is formed, and projected to be displayed in a state in which uneven luminance occurs by a pattern reverse to the luminance distribution in the screen projection surface SC of FIG. 11A, specifically, the left upper side and the right lower side become brighter. As a result, the uneven luminance generated in FIG. 11A is canceled in the screen projection surface SC, the luminance distribution is made uniform as a whole as shown in FIG. 11B, whereby the image can be projected and displayed with high quality.

Figure 12A:
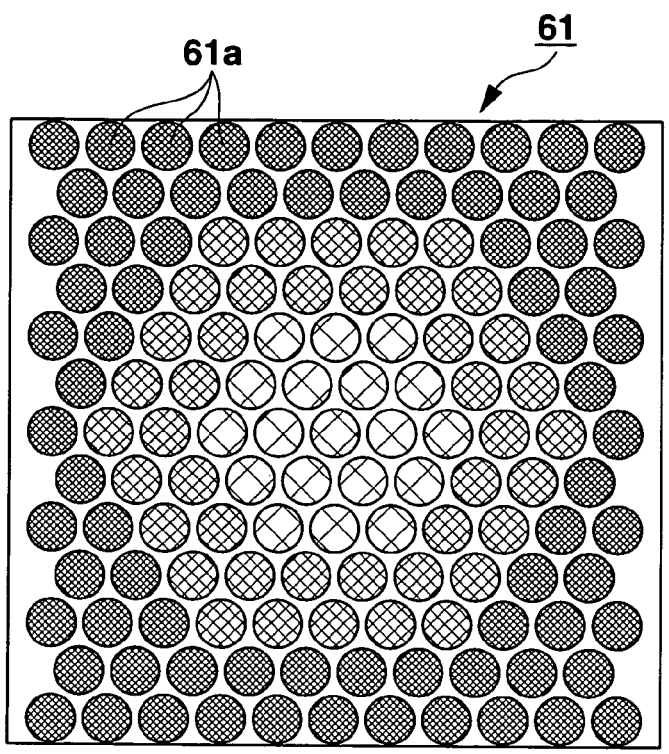
FIG. 12A is a diagram showing a state of emitted light luminance distribution correction in a surface light source according to the second embodiment.

As an example, FIG. 12A shows a state in which an emitted light luminance division section is corrected at the LED array 62 configured by arraying the LEDs 61a, 61a, . . . having the tips formed into dome shapes shown in FIGS. 9A, 9B.

In FIG. 12A, a state in which the LEDs 61a, 61a, . . . emit lights at higher luminance is represented by making hatching dense. Conversely, a state of light emission at lower luminance is represented by making hatching rough.

As shown, luminance is lower at the LEDs 61a, 61a, . . . positioned in the center of the LED array 61, and lights are emitted from the LEDs 61a, 61a, . . . more apart from the center at higher luminance. Accordingly, a state is shown in which a reduction in light quantity in the peripheral part of the screen projection surface SC is prevented to make the luminance distribution uniform as a whole.

Figure 12B:
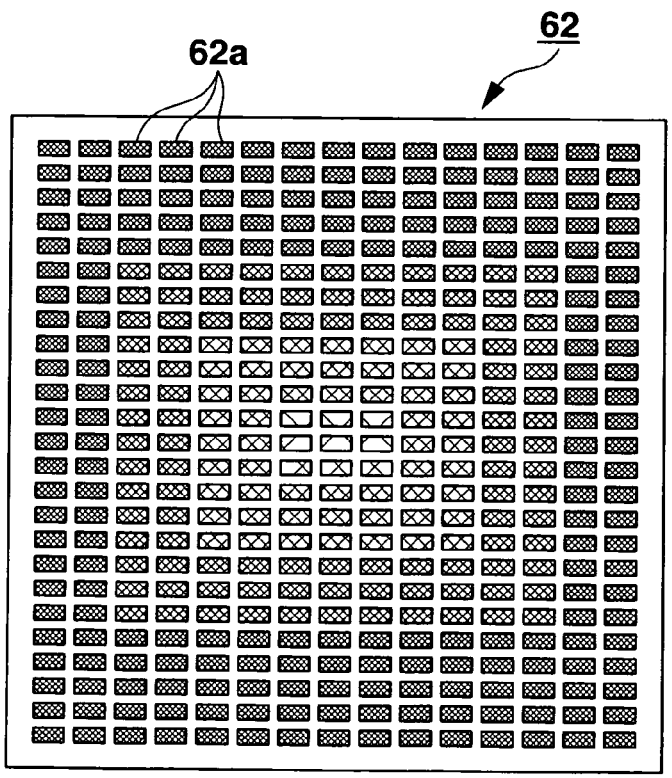
FIG. 12B is a diagram showing a state of emitted light distribution correction in the surface light source according to the second embodiment.

Similarly, FIG. 12B shows a state in which an emitted light luminance division section is corrected at the LED array 62 configured by arraying the rectangular chop-shaped LEDs 62a, 62a, . . . shown in FIGS. 9C, 9D.

In FIG. 12B, a state in which the LEDs 62a, 62a, . . . emit lights at higher luminance is represented by making hatching dense. Conversely, a state of light emission at lower luminance is represented by making hatching rough.

As shown, luminance is lower at the LEDs 62a, 62a, . . . positioned in the center of the LED array 62, and lights are emitted from the LEDs 62a, 62a, . . . more apart from the center at higher luminance. Accordingly, a state is shown in which a reduction in light quantity in the peripheral part of the screen projection surface SC is prevented to make the luminance distribution uniform as a whole.

The luminance distribution correction shown in FIGS. 12A, 12B is advantageous in that considering higher luminance from the peripheral part to the center when all the light emitting elements are driven by the same luminance because of the arraying of the plurality of LEDs 61a, 61a, . . . (62a, 62a, . . . ) of the LED array 61 (62) at the same density, by adjusting emitted light luminance beforehand in accordance with the arranging parts of the individual light emitting elements, an emitted light distribution from the surface light source is made roughly uniform, enabling a reduction of loads on a subsequent luminance distribution correction process. In any case, it is possible to automatically execute luminance distribution correction without any time and labor on a user in the middle of a usual projection operation.

As in the case of the first embodiment, a configuration may be employed in which a projection surface is photographed by a CCD to correct luminance.

As in the case of the first embodiment, the invention is not limited to the example of detecting the image by the CCD to detect luminance. A degree of luminance at each position of the projection surface may be predicted from a shape for executing trapezoidal correction, and an image to be projected may be projected after luminance correction. With this configuration, luminance correction can be easily carried out, and a correction amount can be reduced even when the image is photographed again by the CCD after the image projection to execute luminance correction.

Thus, even when the surface light source configured by arraying a plurality of light emitting elements such as LED is used, it is possible to make uniform a luminance distribution of an actually projected image by recognizing individual differences of the light emitting elements, an operation environment or the like compliant with the arranging positions, and an environment or the like of the projection target side altogether, and executing corresponding luminance correction on the light source side.

By use of the surface light source, it is possible to deal with projection of a color image while simplifying a configuration of a color wheel or the like for properly coloring light from the light source.

The first and second embodiments have been directed to the projector which uses the micromirror element 27 as the spatial optical modulation element (SOM) for forming the light image by the light source light and the display operation. The present invention is not limited to this. The invention can similarly be applied to a projector which uses a transmissive type liquid crystal display panel or the like.

In addition, the present invention is not limited to the above embodiments, but various changes and modifications can be made without departing from its gist.

Furthermore, various stages are included in the embodiments, and various inventions can be derived from a proper combination of a plurality of disclosed configuration requirements. For example, even when some of all the components of the embodiments are deleted, at least one of the problems described above in the background art can be solved, and the configuration of the deleted components can be selected when at least one of the effects of the invention is obtained.

What is claimed is:

1. A projection device comprising:
   a light source;
   an input/output connector section for inputting/outputting image signals of different standards;
   a projection driving section for forming a light image based on image signals input by the input/output connector section to project the light image using light from the light source;
   a detection section for detecting a luminance distribution of an image projected by the projection driving section; and
   a control section for: (i) obtaining an error pattern of the luminance distribution by comparing a luminance distribution of the image signals input by the input/output connector section with the luminance distribution of the projected image detected by the detection section, (ii) detecting a state of direction as well as a state of degree of trapezoidal distortion on a projection target surface based on the obtained error pattern of the luminance distribution, and (iii) correcting the luminance distribution of the light image formed by the projection driving section in accordance with the luminance distribution obtained by the detection section,
   wherein the control section reflects the detected trapezoidal distortion states on a shape of the light image formed by the projection driving section and on the correction of the luminance distribution.

2. A projection device comprising:
   a surface light source configured by arraying a plurality of light emitting elements;
   an input/output connector section for inputting/outputting image signals of different standards;
   a projection driving section for forming a light image based on image signals input by the input/output connector section to project the light image using light from the surface light source;
   a detection section for detecting a luminance distribution of an image projected by the projection driving section; and
   a control section for: (i) obtaining an error pattern of the luminance distribution by comparing an emitted light luminance distribution of the image signals input by the input/output connector section with the luminance distribution of the projected image detected by the detection section, (ii) detecting a state of direction as well as a state of degree of trapezoidal distortion on a projection target surface based on the obtained error pattern of the luminance distribution, and (iii) correcting the emitted light luminance distribution in the surface light source in accordance with the luminance distribution obtained by the detection section,
   wherein the control section reflects the detected trapezoidal distortion states on a shape of the light image formed by the projection driving section and on the correction of the emitted light luminance distribution.

3. The projection device according to claim 2, wherein the control section lowers emitted light luminance of a center than that of a peripheral part of the surface light source.

4. The projection device according to claim 1, wherein the detection section:
   includes a photographing section for photographing the image projected by the projection driving section, and
   detects the luminance distribution from a luminance signal component in image data obtained by the photographing section.

5. The projection device according to claim 2, wherein the detection section:
   includes a photographing section for photographing the image projected by the projection driving section, and
   detects the luminance distribution from a luminance signal component in image data obtained by the photographing section.

6. The projection device according to claim 3, wherein the detection section:
   includes a photographing section for photographing the image projected by the projection driving section, and
   detects the luminance distribution from a luminance signal component in image data obtained by the photographing section.

7. The projection device according to claim 2, wherein the surface light source is configured by distributing and arraying a plurality of light emitting diodes for each of a plurality of color components, and
   the projection driving section forms a light image of a corresponding color component in a time-division manner in synchronization with time-division lighting and driving of the surface light source for each color component.

8. The projection device according to claim 3, wherein the surface light source is configured by distributing and arraying a plurality of light emitting diodes for each of a plurality of color components, and
   the projection driving section forms a light image of a corresponding color component in a time-division manner in synchronization with time-division lighting and driving of the surface light source for each color component.

9. A projection control method for a projection device which comprises a light source and an input/output connector section for inputting/outputting image signals of different standards, the method comprising:
   forming a light image based on input image signals to project the light image using light from the light source;
   detecting a luminance distribution of a projected image;
   obtaining an error pattern of the luminance distribution by comparing a luminance distribution of the input image signals with the detected luminance distribution of the projected image;
   detecting a state of direction as well as a state of degree of trapezoidal distortion on a projection target surface based on the obtained error pattern of the luminance distribution; and
   correcting the luminance distribution of the formed light image in accordance with the detected luminance distribution of the projected image,
   wherein the correcting comprises reflecting the detected trapezoidal distortion states on a shape of the formed light image and on the correction of the luminance distribution.

10. A projection control method for a projection device which comprises a surface light source configured by arraying a plurality of light emitting elements and an input/output connector section for inputting/outputting image signals of different standards, the method comprising:

forming a light image based on input image signals to project the light image using light from the surface light source;

detecting a luminance distribution of a projected image;

obtaining an error pattern of the luminance distribution by comparing an emitted light luminance distribution of the input image signals with the detected luminance distribution of the projected image;

detecting a state of direction as well as a state of degree of trapezoidal distortion on a projection target surface based on the obtained error pattern of the luminance distribution; and correcting the emitted light luminance distribution in the surface light source in accordance with the detected luminance distribution, wherein the correcting comprises reflecting the detected trapezoidal distortion states on a shape of the formed light image and on the correction of the emitted light luminance distribution.

11. The projection control method according to claim 10, wherein the correcting lowers emitted light luminance of a center than that of a peripheral part of the surface light source.

\* \* \* \* \*